No. 679,049. Patented July 23, 1901.
H. EVERSMANN.
FIRE EXTINGUISHING APPARATUS.
(Application filed Dec. 13, 1900.)
(No Model.)

Witnesses
Arthur Kleine
Walter Israin

Inventor
Henry Eversmann
by C. Spengel
Atty.

THE NORRIS PETERS CO., PHOTO-LITHO., WASHINGTON, D. C.

UNITED STATES PATENT OFFICE.

HENRY EVERSMANN, OF CINCINNATI, OHIO.

FIRE-EXTINGUISHING APPARATUS.

SPECIFICATION forming part of Letters Patent No. 679,049, dated July 23, 1901.

Application filed December 13, 1900. Serial No. 39,591. (No model.)

*To all whom it may concern:*

Be it known that I, HENRY EVERSMANN, a resident of Cincinnati, Hamilton county, State of Ohio, have invented certain new and useful Improvements in Fire-Extinguishing Apparatus; and I do declare the following to be a description of the invention sufficiently clear, full, and exact to enable others skilled in the art to which it appertains to make and use the same, attention being called to the accompanying drawings, with the reference-numerals marked thereon, which form also a part of this specification.

This invention relates to improvements in fire-extinguishing systems of the kind providing discharge-outlets, all being fed from one system of supply-pipes to which they are connected. The various supply-pipes are again fed from a general supply-pipe controlled by a main valve, the operation of which is usually subject to devices controlled by temperature. These devices are usually thermostats or fusible connections and are affected by the rising temperature due to the heat radiated from a fire, when they operate and transmit their action in a manner to cause a general supply to become available to the feed-pipes and to discharge from their outlets.

The invention is more applicable to a plant where the pipes supplying the outlets do not normally carry water and finally where the supply to these pipes is shut out by a valve (the main valve above referred to) which is controlled—that is, held closed—by air under pressure and opens to admit water to the pipes only upon reduction of such pressure by reason of escape of air.

The particular feature of this invention consists of the construction of a valve which may be used in connection with a system as above outlined and which permits escape of leakage from the system without impairing the operativeness of the same.

In the following specification and particularly pointed out in the claims at the end thereof is found a full description of the invention, together with its operation, parts, and construction, which latter is also illustrated in the accompanying drawings, in which—

Figure 1:
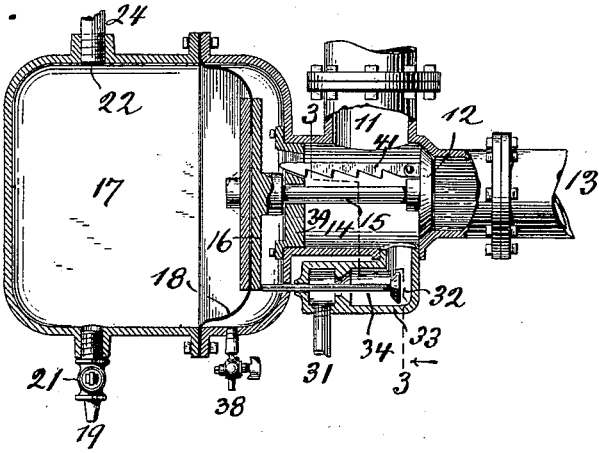
Figure 2:
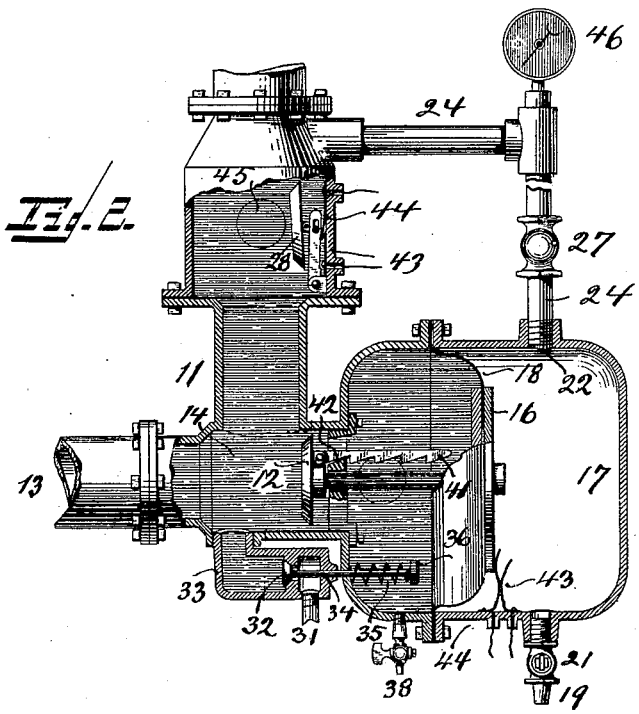
Figure 3:
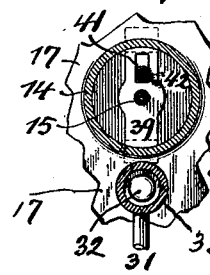

Figure 1 is a vertical longitudinal section of the valve mechanism used in connection with such a fire-extinguishing apparatus. Fig. 2, in a similar view, shows the same valve modified. Fig. 3 is a vertical cross-section taken on line 3 3 of Fig. 2.

Since the use of sprinkler-heads or spray-nozzles in connection with fire-extinguishing apparatus is desirable, such conjoint use being usually the case, and since my invention may readily be and preferably is used in such connection, I have so described it. In such connection the release of a sprinkler-head upon disruption of the fusible connection holding it closed acts as the automatic means to turn on the supply. These outlets (not shown) are supplied from a pipe system consisting of upright trunk-pipes and branch pipes connected therewith, all numbered 11 and normally empty of water, kept so by a valve 12, which shuts out the water-supply from main pipe 13. This valve (see now more particularly Fig. 1) is suitably supported and guided for its reciprocating movements within its housing 14, being for such purpose preferably carried on a stem 15, which has at its other end a flange 16, capable of a reciprocating movement within a casing 17. Said flange partitions this latter into two parts, closed air-tight against each other by means of a diaphragm 18, which is preferred to the use of a tight-fitting packed piston. Of the parts of this casing resulting from this subdivision the one nearest valve-housing 14 is in open communication therewith, as shown. Valve 12 is kept seated, so as to keep out the water from pipe 11, as before described, by means of a compressed fluid or air, which fills casing 17 on the opposite side of the diaphragm. This fluid is introduced through a nipple 19, which is closed after filling by a cock 21. The pressure of this fluid or air is such that it overbalances the pressure of the water against valve 12, which action is augmented by reason of the size of the diaphragm being increased in area as against the area of valve 12. The parts remain in this condition until reduction in pressure within casing 17 permits valve 12 to yield to the pressure of the water, when it opens, admitting water to the pipe systems and discharge of it through any open outlets. This reduction in pressure is had by permitting escape of air through an outlet, which outlet, normally closed, is open at such time. This opening of it may be caused automatically, depending on the operation of devices affected by the heat of a fire, or it may be direct by manual operation.

The devices referred to first consist, usually, of sprinkler-heads connected to a system of pipes supplied from pipes 11, the whole being charged with compressed air, the same as casing 17, and which sprinkler-heads are normally closed by means of fusible material. Upon melting of this material in consequence of fire the outlets held closed thereby become open and permit escape of air. This also causes a reduction of pressure in casing 17, because the same is in open communication with the air-charged pipe system by means of a branch pipe 24, whereupon valve 12 yields to the pressure of the water and admits the same to supply-pipes 11.

It is desirable to interpose a check-valve 27 to prevent water from entering casing 17 at such times when the system is in operation and charged with water, as shown in Fig. 2. It is also necessary to provide an additional valve 28, serving as a check, to prevent the air from acting against the other side of piston 16 during the normal condition of the parts. Cock 21 serves, in addition to its function of permitting charging of the casing, also as a drip-cock, by which any accumulation caused by leakage or condensation may be drained off from time to time as necessary. Any leakage past valve 12 is accommodated by outlets 31, which are constantly in open communication with valve-housing 14, affording a free outlet and preventing accumulation of water in the pipe system. During operation of the apparatus, however, and when valve 12 is open it is desirable that these outlets be closed; otherwise the supply will be weakened to the extent of the water wasted through them. For such purpose I provide a valve 32, which closes at the same time when valve 12 opens and thereafter shuts off communication with these outlets. As shown in Figs. 1 and 2, this valve occupies a valve-housing 33, within which it is guided and supported by being carried on a stem 34. This stem extends into the casing 17, and when valve 12 is closed its end rests against piston 16. It is further of such length that when the parts are in this position valve 32 is held open and cannot close until flange 16 and its diaphragm recede with valve 12, when this latter opens. The rush of the water is then expected to close valve 32. In Fig. 2 this closure may be effected or aided by a spring 35, bearing against a shoulder 36 on the inner end of valve-stem 34. It is preferable to provide drip-cocks 38 to permit draining whenever necessary of this particular part of casing 17. Since this open outlet 31 would during the normal condition of the system permit also escape of the compressed air when such is used, it becomes necessary to provide means to prevent such, and which means are provided by valve 28, previously described. This valve is raised by the onward rush of the water when the same enters the pipe system, as shown in Fig. 2.

As shown in Figs. 1 and 2, a special piece or spider 39 is used for guiding the valve-stem. The formation and shape of these parts are, however, such as not to interfere with the free communication between valve-housing 14 and the adjacent part of casing 17.

Valve 12 after open, is held so by a ratchet device, of the component parts of which one is a ratchet-bar 41, pivotally attached to valve 12 and engages with a tooth 42, formed within an opening in the part which guides valve-stem 15.

It is customary to provide a signal in connection with such a plant, which gives information at the proper place of the fact that the apparatus is in operation, thus serving as an indicator and fire-alarm. These signals are usually electrically operated by means of an open circuit provided with contact-pieces whereby such circuit is closed. Parts of the apparatus set in motion are used for such purpose, and in this case diaphragm 16 or valve 28 may be used to effect contact between contact-pieces 43 44.

Hand-holes 45 to permit access when required to valves or other interior parts to restore them to normal position or for other purposes are provided wherever necessary. 46 is a pressure-gage.

Having described my invention, I claim as new—

In a fire-extinguishing system, the combination of a valve-housing, a supplemetary valve-housing 33 in free communication with it and open to the atmosphere, a water-pipe in communication therewith, a valve within the housing, a diaphragm connected therewith and normally holding the same closed against the water-pipes mentioned, being held so by air under pressure, means operating to cause escape of such air to permit the valve to open, a valve in this supplementary housing and a stem extending from one side thereof to within operative reach of the diaphragm so as to be actuated thereby for the purpose described.

In testimony whereof I hereunto set my hand in the presence of two witnesses.

HENRY EVERSMANN.

Witnesses:
C. SPENGEL,
ARTHUR KLINE.